Figure 1:
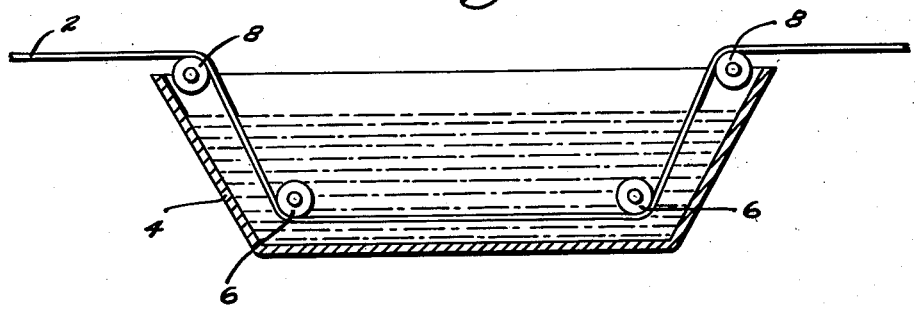

July 4, 1950     R. R. STEVENS     2,514,145
FILTER MATERIAL
Filed March 29, 1946

Inventor:
Raymond R. Stevens
by H. McCready
Attorney.

Patented July 4, 1950

2,514,145

UNITED STATES PATENT OFFICE 2,514,145

FILTER MATERIAL

Raymond R. Stevens, Millbury, Mass., assignor to The Felters Company, Boston, Mass., a corporation of Massachusetts Application March 29, 1946, Serial No. 658,172

6 Claims. (Cl. 183—45)

This invention relates to filters of the type used in respirators, air-conditioning apparatus, and in various other filter structures designed to remove the solid materials from a gaseous stream in which they are entrained.

When such apparatus is used for the purpose of cleaning up an air stream sufficiently to make it fit to breathe, an exceptionally high degree of separation of the solids is necessary. This requirement, when considered alone, indicates the use of a relatively dense filter body in which the voids, pores and air passages will be so small as to strain out the solid particles very thoroughly. Unfortunately the satisfaction of this requirement involves an increase in the resistance to the flow of air through the filter body which may not be serious if the air stream is propelled by power, but which becomes a very important factor in an article, such as a respirator, in which the air flow is created by the respiration of the individual wearing the device.

In a respirator, therefore, practical considerations lead to the adoption of a material which represents a compromise between that degree of porosity or permeability which will permit the necessary volume of air to pass through it under normal conditions of use, and a degree of filtering effectiveness necessary to meet the requirements of the individual. Actually the ideal result sought is not realized by a very considerable margin but it is accepted as the best that can be obtained under practical circumstances.

Air and gas filters in common use comprise felts, including both real felts made from wool fibers, or mixtures of wool with other fibers, cotton in various sheeted forms, numerous kinds of matted fiber bodies, and similar structures. In all of them, so far as I have been able to learn, the effectiveness of the filtering medium depends solely upon its mechanical structure, the smaller the interstices through which the air passes, other factors being equal, the more thorough is the filtering action. In some cases it has been the practice to include fillers in more or less finely divided form for the purpose of better controlling the size of the passages or interstices through which the air flows. In all of these cases, however, the sole reliance for filtering effectiveness is placed on the size of these interstices left in the filtering medium for the passage of air.

I have discovered that a surprising increase in the effectiveness of a fibrous body, such as felt, as a filtering medium, can be produced by impregnating that body with a solution, emulsion, or other liquid dispersion of a hard, highly frangible resinous material, such as rosin, drying the material, and subsequently mechanically working the impregnated felt to break up the more or less filmy or extended form of the dried resinous deposit.

For example, good results have been obtained by impregnating a web of wool felt, such as those which have been used for air filtering purposes, with a solution of zinc hardened rosin in carbon tetrachloride, the concentration of the rosin being sufficient to increase the weight of the felt by from 5% to 15%. This may be done by running it through a bath of the solution, squeezing out the surplus, allowing the web to dry, and then running it between fluted rollers, or through a row of stationary bars so shaped and arranged that the material is bent sharply many times and at closely spaced intervals.

The nature of this mechanical treatment is such as to break up the resinous film into small particles, some of which may be left free but more of them adhering to the fibrous elements of the felt.

Figure 2:
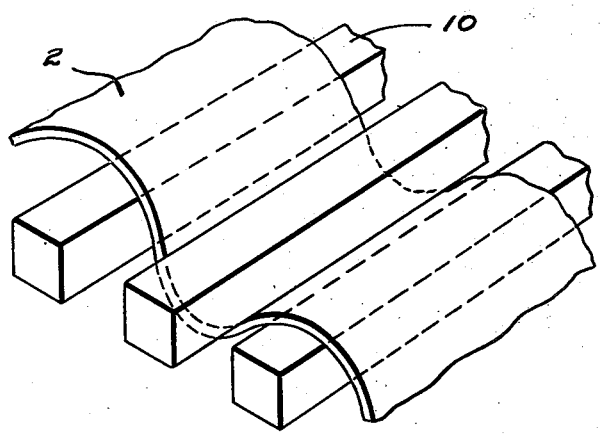

An apparatus suitable for use in practicing this method is illustrated in the accompanying drawings, in which Fig. 1 is a longitudinal, vertical, sectional view of a tank with which the impregnating operation may be performed; and Fig. 2 is a perspective view of portions of an apparatus suitable for performing the mechanical step above referred to.

Figure 3:
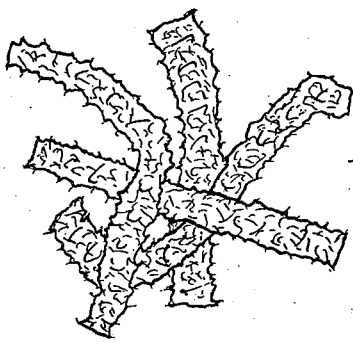

Figure 3 is an enlarged perspective view of several of the fibers after treatment, that is, after being coated and after fracturing of the coating.

In Fig. 1 the web of felt 2 is illustrated as being drawn through a bath of impregnating solution held in the tank 4, the web being guided by the rollers 6 and 8. After being dried, it is drawn over and under a series of bars 10, three of which are shown in Fig. 2, which bend it sharply and in reverse directions, in the manner above described, and thereby break up the resinous residue held in the body of the felt.

Careful tests made with filters produced in this manner on different dusts, fumes, and the like, have shown a surprising increase in the weight of material retained by the filter, as compared with the same tests, duplicated as closely as possible, but differing only in the fact that the filtering material was not impregnated, and subsequently treated mechanically as above described. Both the impregnating and mechanical breaking steps are essential, impregnating alone, without mechanically breaking, producing results no better than those obtainable with the unimpregnated felt. This step of breaking up the coating of resinous material adhering to the fibers has proved to be exceedingly important in producing the very high degree of filter value and effectiveness which are so important in respirators and other filter devices employed for the purpose of removing silica dust and other finely divided toxic agents present in the air which must be breathed by the workers in many industries. The best results have been produced with a true felt. That is, a fibrous body composed essentially of wool, hair, or equivalent fibers having felting characteristics and without spinning, weaving, braiding, or other mechanical fabricating operations upon which the integrity of most other fabrics depend.

In a true felt the strength and integrity of the product depends upon the interlocking of the fibers with each other, usually created by the action of heat and moisture and, usually, also, with some mechanical working or beating which produces the peculiar interlacing of the fibers with each other that is characteristic of felted goods. In these fabrics at least the major part of the fiber constituent usually is wool, although minor proportions of other fibers which do not have felting characteristics can be incorporated in them.

In this application and in the claims the terms "felt," "felted," or "felting" will be used with the meanings customarily given to them in the felt industry.

Naturally the density and thickness of the felt used will depend upon the requirements of individual situations. For respirators, an all-wool felt varying from .04 to .010 inch in thickness and weighing in the neighborhood of from 8 to 16 oz. per square yard give good results. The resins which have proved best are rosin (colophony), both the common commerical form and also the harder grades, orange shellac, copal gum, dammar gum, the hard pine resin called Vinsol and ester gum, but a considerable variety of other materials of a resinous nature, such as sealing wax, are known to be capable of cooperating in the same manner with wool fibers.

Tests which proved of particular interest were those dealing with silica dust, lead fumes and lead dust because of the difficulty of separating these substances thoroughly from an air or gas stream, and the importance of such separation in many industrial processes. Filters made in accordance with this invention, and essentially as above described, yielded results which were particularly striking. Thus in the case of a test with silica dust, samples of felt treated in accordance with the method above described showed an increase in efficiency of from 40% to 45% over the untreated samples. With lead dust an increase in efficiency of approximately 70% was realized. Similarly, in testing with lead fumes the treated samples showed an increase in efficiency of more than 40%, as compared to the untreated samples.

The increase in air resistance resulting from the impregnating and mechanical treatment above described is negligible with such concentrations as those above referred to, namely, from 5% to 15% of the weight of the felt. This matter of concentration does not seem to be critical so long as a reasonable minimum weight of rosin is used. The percentage should not be less than 2%, nor should it be greater than 50% because these higher percentages do increase the resistance to air flow without yielding any compensating increase in dust retention properties.

Figure 3 is merely illustrative of several of the fibers having thereon the coating which has been fractured.

While these filter materials have been developed primarily for use in filtering air and other gaseous fluids in respirators, air-conditioning equipment and filters employed for industrial purposes, their use is not limited to any specific field. Also, while they are not intended to change the chemical composition of the gaseous stream on which they are acting, it is contemplated that they may be used in connection with chemicals which do perform that function.

Having thus described my invention, what I desire to claim as new is:

1. A filter body of the character described, comprising fibers felted together and impregnated with resinous frangible material, said resinous material being fractured on the surfaces of the fibers into small adhering fragments.

2. A filter body of the character described, comprising fibers felted together, said fibers being coated with a frangible resinous material at least partially fractured into small adhering fragments.

3. A filter body of the character described, comprising fibers felted together to form a mass, said felted mass being impregnated with sufficient frangible resinous material to increase the weight of the mass by from 5% to 15%, the resinous material being fractured on the surfaces of the fibers into small adhering fragments.

4. A filter body according to preceding claim 2, in which the major portion of the fibers are wool.

5. A filter body according to preceding claim 1, in which said resinous material has an amorphous structure.

6. A filter material of the character described, comprising a felt body and small fragments of a hard, brittle, resinous material distributed substantially throughout the structure of said body with a substantial proportion of said fragments adhesively bonded to the fibers of the felt, said resinous material being present in from 2% to 50% of the weight of the felt.

RAYMOND R. STEVENS.

REFERENCES CITED

The following references are of record in the file of this patent:

UNITED STATES PATENTS

| Number | Name | Date |
|---|---|---|
| 1,674,580 | Van Sluys | June 19, 1928 |
| 1,970,426 | Levin | Aug. 14, 1934 |
| 2,019,241 | Weiss | Oct. 29, 1935 |
| 2,114,682 | Gumaer | Apr. 19, 1938 |
| 2,178,614 | Glayter | Nov. 7, 1939 |

FOREIGN PATENTS

| Number | Country | Date |
|---|---|---|
| 292,479 | Great Britain | June 13, 1929 |
| 433,190 | Great Britain | Aug. 9, 1935 |